Jan. 27, 1959   B. W. KEESE   2,870,854
TANDEM AXLE DRIVE AND LUBRICATING MEANS THEREFOR
Filed June 27, 1956   4 Sheets-Sheet 1
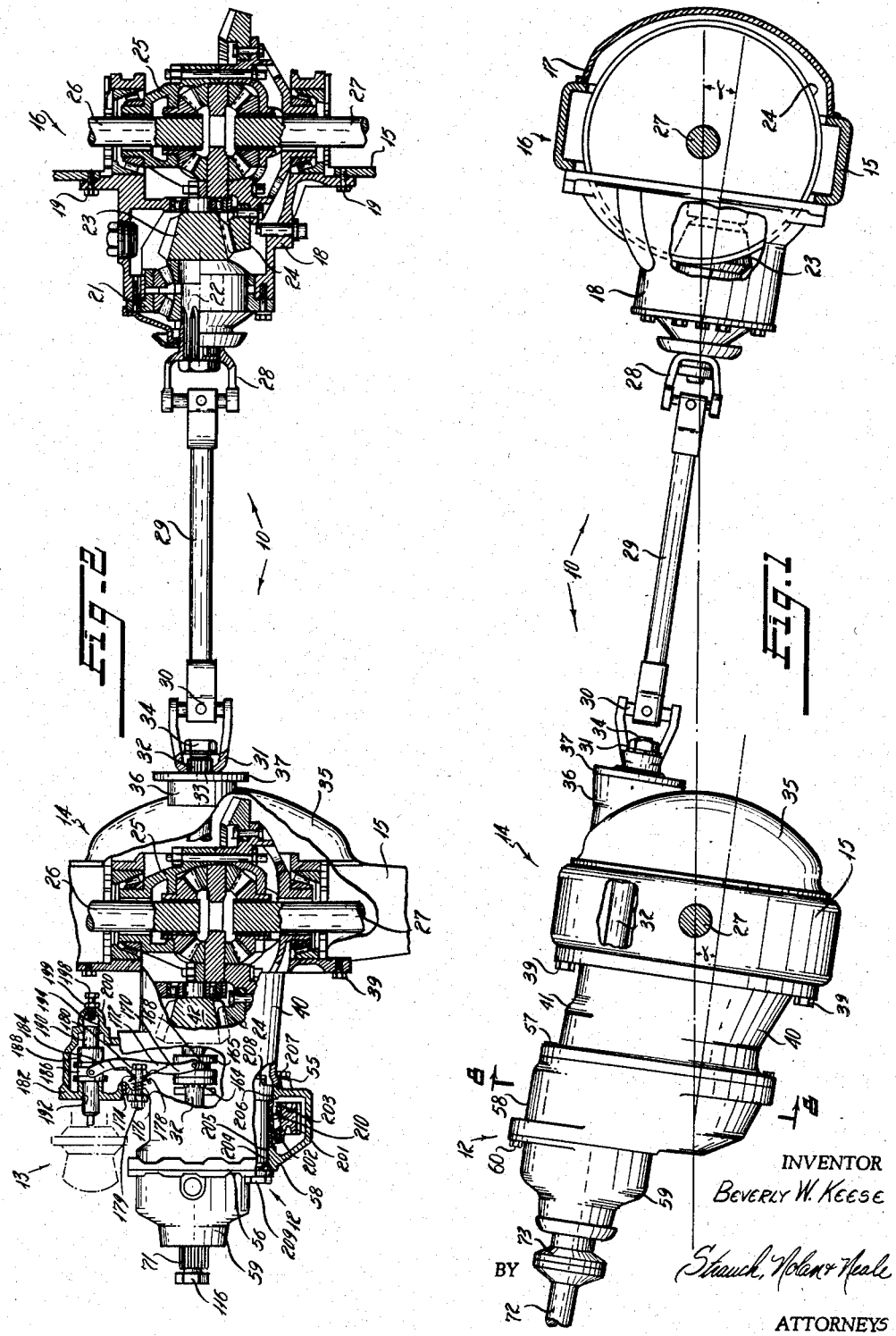
INVENTOR
BEVERLY W. KEESE
BY
Strauch, Nolan & Neale
ATTORNEYS Jan. 27, 1959 B. W. KEESE 2,870,854
TANDEM AXLE DRIVE AND LUBRICATING MEANS THEREFOR
Filed June 27, 1956 4 Sheets-Sheet 2
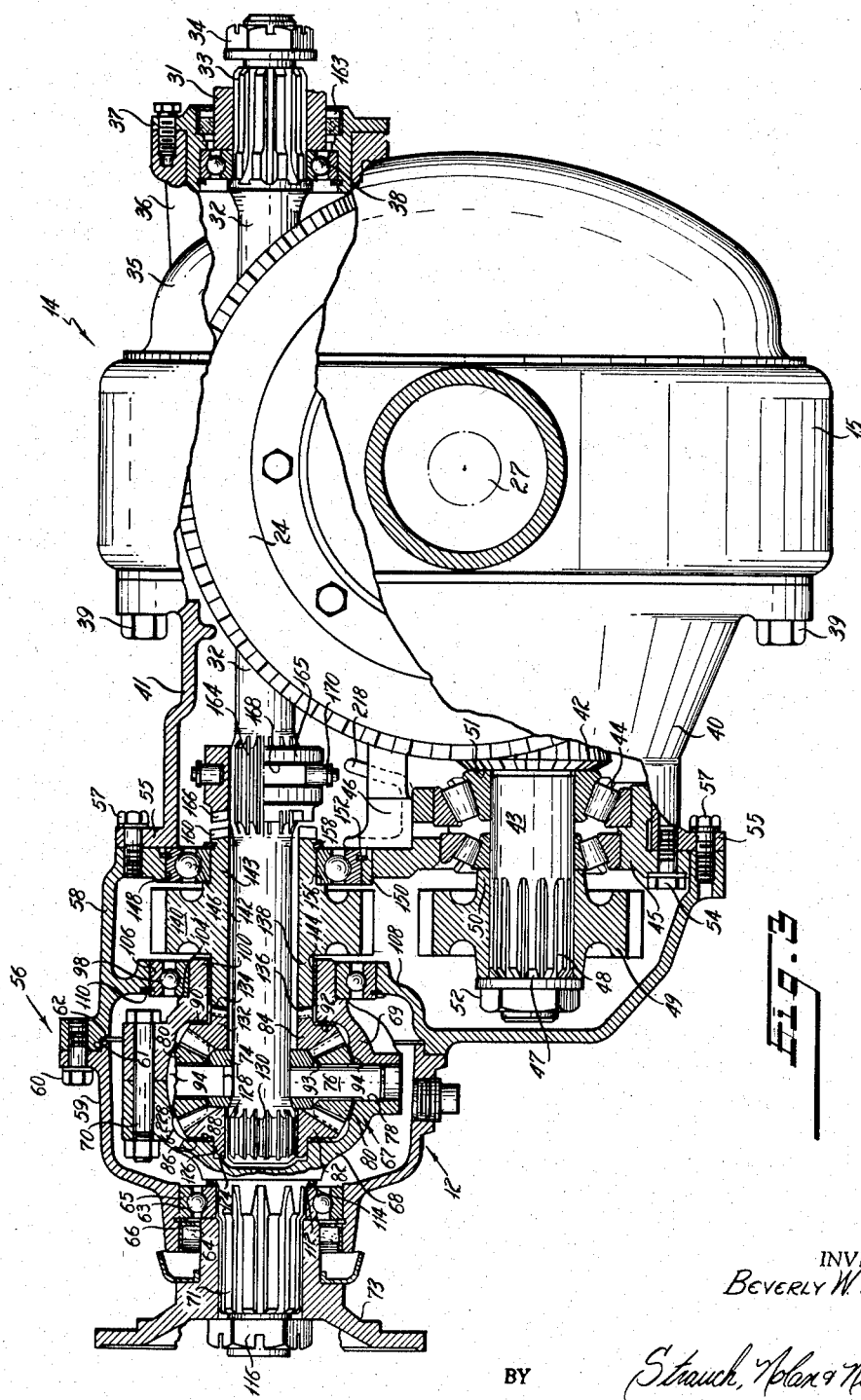
INVENTOR
BEVERLY W. KEESE
BY Strauch, Nolan & Neale
ATTORNEYS

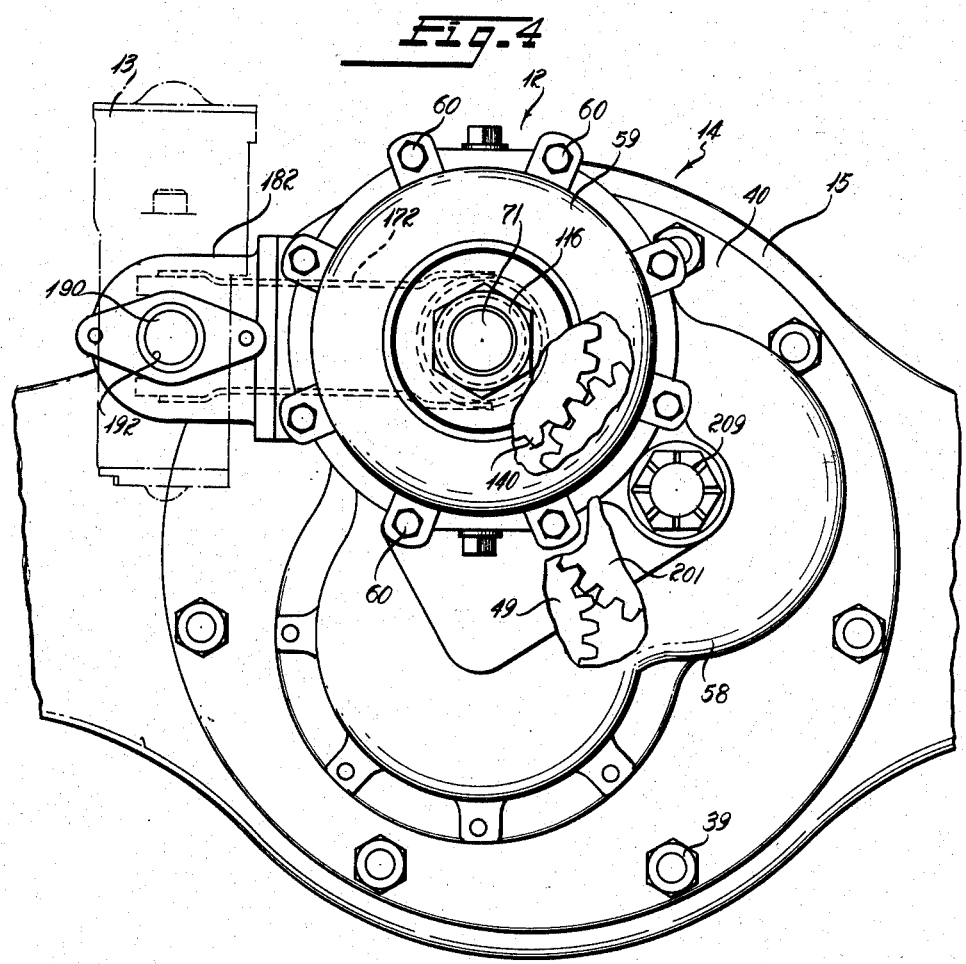
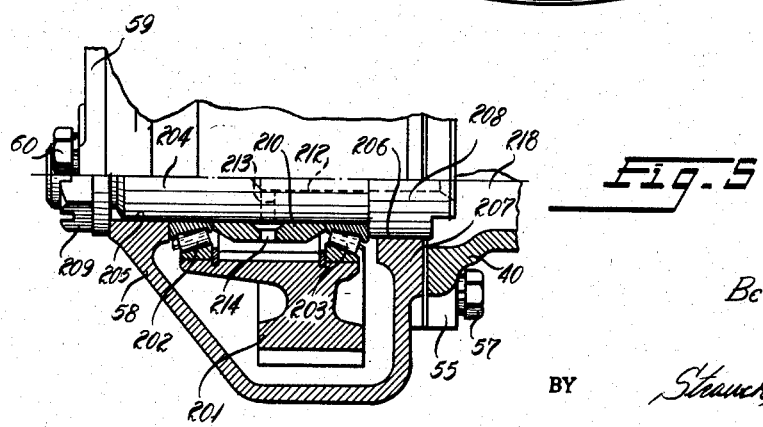

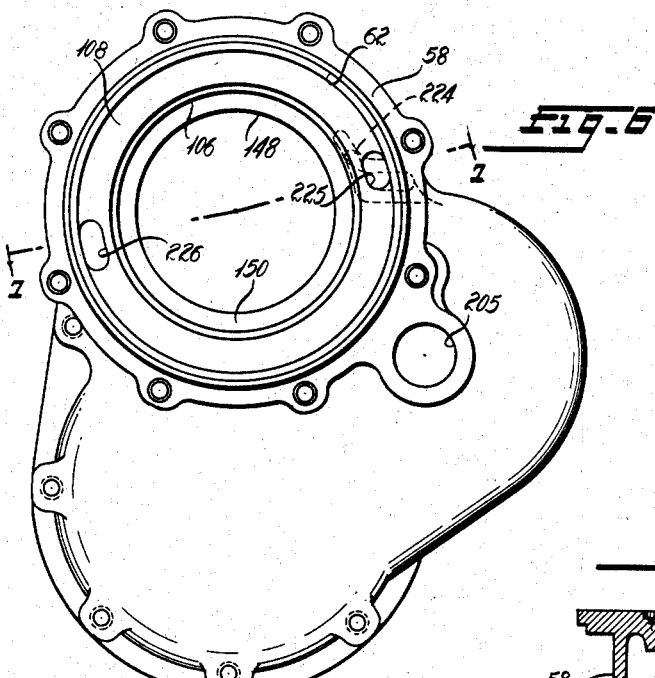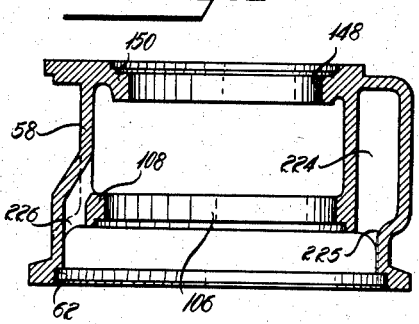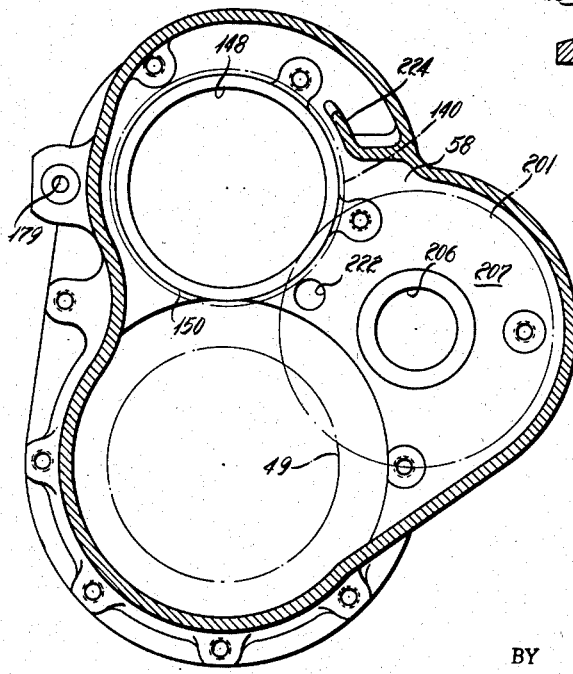

# United States Patent Office 2,870,854
Patented Jan. 27, 1959

2,870,854

TANDEM AXLE DRIVE AND LUBRICATING MEANS THEREFOR

Beverly W. Keese, Neenah, Wis., assignor to The Rockwell-Standard Corporation, a corporation of Pennsylvania Application June 27, 1956, Serial No. 594,155

2 Claims. (Cl. 180—22)

This invention relates to tandem axle drives for roadway vehicles and more particularly to improved tandem axle drive mechanism preferably equipped with an interaxle differential and lockout, and is a continuation-in-part of my co-pending application Serial No. 480,765, filed on January 10, 1955.

In vehicles equipped with a multi-axle tandem drive assembly, when traction between the vehicle tires and the ground surface is good, as in highway travel, it is desirable to divide engine torque equally between the tandem drive axles and between the driving wheels on the axles. But, when travelling on slippery snow or ice covered road or for off-the-highway travel over soft ground, or through sand or mud, or during any other condition of poor traction, it is desirable to provide positive drive to both of the tandem drive axles to prevent dissipation of all the driving force to the tandem drive axles through a spinning wheel of one axle.

To accomplish equal division of torque to all driving wheels of tandem driving axles a third differential is normally utilized between the engine driven main propeller shaft and the input shaft of the tandem drive axles both of which include a conventional differential between the two axle sections. An example of such an arrangement is disclosed in U. S. Patent No. 1,492,380 to A. H. Leipert. The third or interaxle differential is usually further modified by incorporating a lockout device for introducing or locking out the interaxle differential thus enabling equal torque transmission to each drive axle or positive drive to each drive axle.

This invention is particularly adapted to a tandem drive axle unit with hypoid gear single reduction drive axles, and differentiates from the invention in co-pending application Serial No. 480,765 by using a bevel gear interaxle differential instead of a spur gear interaxle differential, together with novel modifications enabling use of the more economical bevel gear differential. The various elements of the drive mechanism are so interrelated that both drive axle housings and drive axle differential mechanisms are essentially identical and interchangeable. For convenience in describing the invention throughout the specification, the description will refer to a tandem drive of a rear wheel suspension, but it is to be understood that a front tandem suspension is also contemplated, in which case the tandem axle assembly would be driven from the rear and the hypoid pinions and gears would be formed for such an arrangement. The differential carrier and the rear cover on the forward tandem drive axle are so constructed as to provide straight through passage of the drive line for the rearward tandem drive axle, and the forward tandem axle carrier housing also provides support mounting for an interaxle differential and related controls. The simplified structural arrangement of this invention enables a straight line drive connection from and including the main propeller shaft to and including the rearward axle drive pinion shaft or stem during normal loaded conditions with no articulation between the tandem drive axles. In the preferred embodiment, as shown in Figure 1, the gear transmission to the forward axle hypoid driving pinion, besides being of rugged construction, is so arranged that the forward axle hypoid driving pinion is located the same distance below the horizontal plane containing the axes of the tandem drive axles as the rearward axle driving pinion and is disposed with its axis parallel to the straight line axis of the through drive to the rearward axle. The straight line through drive during normal drive conditions substantially reduces universal joint wear at both ends of the main and interaxle propeller shafts since the joint elements are not articulated most of the time, and identical orientation of the hypoid driving and driven gears in each axle of the tandem assembly provides efficient functioning of both drive axles as though the drive pinions for both driving axles were on a single shaft.

Accordingly, the primary object of this invention is to provide an improved tandem axle drive with a bevel gear interaxle differential and having a substantially straight line through drive connection from the main propeller shaft to the rearward axle drive pinion.

Another object is to provide, in a tandem axle drive, a novel combination of a bevel gear interaxle differential and special drive transfer gearing to the forward axle of the assembly.

A still further object resides in providing in a tandem axle drive with a bevel gear interaxle, a straight through line drive connection to the rearward drive axle from the interaxle differential passing through the forward axle differential carrier and axle housings and through a combined cover and bearing support mounted on the rear of the forward tandem drive axle housing.

A further object resides in the provision of a tandem drive axle unit with a bevel gear interaxle wherein the through drive line to the rearward drive axle is a longitudinally straight line continuation of the drive line through the propeller shaft to the interaxle differential with the drive line parallel to the longitudinal axis of the vehicle and the through drive line to the rearward drive axle, with the tandem axle unit in normal loaded and unarticulated condition, is a substantially straight line continuation of a sloped drive line through the propeller shaft to the interaxle differential.

A still further object resides in providing an improved tandem drive assembly with an improved bevel gear interaxle differential mechanism including a differential lockout mechanism.

Still another object resides in providing a tandem single reduction hypoid drive axle assembly with a bevel gear interaxle differential carried by the forward axle and a straight through sloping drive line between the interaxle differential and the rear axle hypoid drive pinion.

It is a further object of the invention to provide a novel tandem axle drive wherein the forward and rearward axle mechanisms are mainly interchangeable and in novel combination with a bevel gear interaxle differential carried by the forward tandem axle.

A further object of the invention is to provide a tandem axle hypoid gear drive from the output of a bevel gear interaxle differential wherein the input pinion shafts to the axles are parallel and the input pinion shaft to the rearward tandem axle lies in a substantially straight line with the engine driven main propeller shaft.

Further novel features and objects of this invention will become apparent from the following detailed description and the appended claims taken in conjunction with the accompanying drawings showing a preferred embodiment thereof, in which:

Figure 1 is a side elevation of a tandem drive axle assembly according to a preferred embodiment of the invention equipped with a bevel gear interaxle differential with some parts broken away, other parts in section and still other parts shown diagrammatically;

Figure 2 is a partially broken away and partially sectioned top plan view of the tandem drive axle assembly of Figure 1;

Figure 3 is an enlarged partially broken away and sectioned side elevation illustrating particularly the bevel gear interaxle differential, the through drive shaft for the rearward tandem axle and the forward tandem axle drive;

Figure 4 is an enlarged partial front elevation of the forward tandem drive axle with the interaxle differential casing partially broken away to show the cloverleaf arrangement of the gear transmission for the forward tandem drive axle;

Figure 5 is an enlarged sectional detail of a portion of Figure 2 showing the mounting of the transfer drop gear for the forward tandem drive axle;

Figure 6 is a front elevation view of the rear section of the interaxle differential housing;

Figure 7 is a section view taken on line 7—7 of Figure 6 illustrating lubrication details; and Figure 8 is a section view taken of the rear section of the interaxle differential housing taken on line 8—8 of Figure 1 with the transfer gear diameters illustrated in phantom lines.

In the drawings, Figures 1 and 2 illustrate a tandem drive axle assembly 10 constructed in accordance with a preferred embodiment of this invention. The assembly 10 is located beneath the rear of a vehicle chassis (not shown) and is equipped with a bevel gear interaxle differential 12 having an air or vacuum differential lockout actuating unit 13 mounted on the forward tandem drive axle 14. Forward drive axle 14 and rearward drive axle 16 are relatively closely spaced and constitute a tandem drive axle assembly connected to the vehicle chassis by the usual suspension. Although it is to be understood that the illustrated tandem axle assembly is located beneath the rear of the chassis and the chassis, the suspension details and the outer wheel supported ends of the axles are not shown because their details do not comprise part of this invention.

Each axle comprises an identical transverse axle housing 15 having a rear opening closed by a cover and a front opening over which is secured the differential carrier. The rearward tandem axle cover 17 completely closes the associated axle opening. The rearward tandem axle differential carrier 18 is removably secured to housing 15 as by bolts 19 and carries a bearing assembly 21 for rotatably mounting an input pinion stem 22 having an integral hypoid pinion gear 23 meshed with a hypoid ring gear 24 fixed on the rotatable cage of the axle differential 25.

Each of the axle differentials 25 is preferably the usual bevel gear differential mechanism having coaxial axle shafts 26 and 27 extending from the differential side gears to the wheels (not shown). As illustrated in Figure 1, the axes of the pinion stems are disposed at an angle α to the horizontal plane containing the axes of front and rear drive axles 14 and 16 under normal level road conditions, the axle housings being tilted rearwardly through the same angle with the vertical. Preferably each drive axle assembly 14 and 16 is a conventional single reduction hypoid gear drive axle that are tilted at the required angle for purposes of the invention but whose details are otherwise not part of the invention.

The front end of rear axle pinion stem 22 is splined to one side of a universal joint 28 that couples it with an interaxle propeller shaft 29 having at its front end one side of a universal joint 30. The other side 31 of universal joint 30 is secured on the end of a drive shaft 32, projecting rearwardly from the forward axle 14, as by splines 33 and nut 34 (Figure 3).

The forward tandem axle 14 comprises transverse housing 15 having its rear opening closed by a modified cover 35, somewhat similar to cover 17 but having an opening formed by a short tubular extension 36. Secured in the extension 36 is a bearing retainer 37 carrying a bearing 38 for supporting the rear end of drive shaft 32.

Removably secured over the front opening of the forward axle housing 15, as by studs and nuts 39 (Figure 1), is a differential mechanism carrier 40 with an upper portion 41 formed to provide a through passage for shaft 32. Within axle housing 15, the carrier legs and the differential 25, including the rotatably mounted cage and the bevel gear differential, from which extend coaxial axle shafts 26 and 27, are the same as in the rearward axle 16. In fact, the axle housings 15 and the differential and axle shaft elements are interchangeable between the axles 14 and 16. This enables the use of standard mass production parts to facilitate assembly and reduce costs and inventory. Identical parts in the two axles are indicated by identical reference numerals.

Figure 3 shows the forward tandem axle drive in enlarged detail. The hypoid ring gear 24 of the axle differential is meshed with input hypoid pinion 42 which has an integral pinion stem 43 journalled in a combined thrust and radial bearing assembly 44 mounted in a cage 45 secured to the lower portion of a vertical wall 46 of carrier 40 as by bolts 54. The end of stem 43, to the rear of pinion 42, can be supported in a bearing carried by a web integral with carrier 40, as shown in Figure 2. As distinguished from the stepped diameter rear axle hypoid pinion stem 42, the front axle hypoid pinion stem 43 has a constant diameter and the inside diameters of the two bearings used in bearing assembly 44 are the same size. The forward end 47 of pinion stem 43 has external splines 48 engaging internal splines in a lower transfer gear 49. A rear hub extension 50 of transfer gear 49 abuts the side of the inner race of the front bearing in bearing assembly 44 while a shoulder 51 of the hypoid pinion 42 abuts the opposite side of the inner race of the rear bearing in bearing assembly 44. A nut 52 on the threaded front end of pinion stem 43 engages a front hub extension of transfer gear 49 and clamps the gear 49, hypoid pinion 42, stem 43 and bearing assembly 44 in assembled axially fixed position relative to the differential carrier wall 46.

Although it is possible and would be desirable from a standardized and economic viewpoint, to use a standard production hypoid pinion and stem in the front carrier, identical with the production type pinion and stem used in the rear carrier, it has been found through tests that helical transfer gear 49 mounted on the overhanging forward pinion stem 43 will produce overhanging loads on the stem. These overhanging loads have no detrimental effect on the pinion bearing assembly 44 but the effect of an overhanging load on the stem 43 itself, from a strength and stiffness standpoint, resulting from bending, torsion and shear, was found to be in excess of that desired for most satisfactory service. Premature stem failure could result if a standard pinion 23 and stem 22 were used in such an installation. Dynamometer tests on the forward carrier have indicated that undesirable end loadings on the teeth of the idler and driven helical gears of the transfer gearing would occur as a result of the excessive pinion stem deflection which would be permitted in a standard pinion and stem.

As illustrated in Figure 2, the rear carrier pinion stem 22 is stepped down in diameter between the rear and forward bearings. By omitting a step down in the forward pinion stem 43, the stem diameter and hence cross-sectional area of its forward end 47 is increased. A further increase of cross-sectional area is realized by changing from the standard number of deep splines to an increased number of shallow splines 48. For example, a standard hypoid pinion and stem with ten straight sided deep splines, as illustrated by the rear pinion stem, would be replaced with a hypoid pinion having a stem with twenty-one shallow splines. The outside diameter and root diameter of the splines is increased by these two differences in pinion stem construction.

Another difference in the forward pinion stem 43 over the standard rear pinion stem 22 is in the shortened run out of splines 48 which terminate within the helical gear rear hub extension 50. Thus the full diameter of a non-splined portion of the forward pinion stem 43 will be effective to support the gear 49 at the end of hub extension 50. Although this does require a non-standard pinion and stem for the forward carrier, the gain in strength and stiffness is considerable and is far more significant than lack of standardization. On comparable sized pinions and stems, the new non-standard stem cross-sectional area at the gear hub inner end is almost double, the section modulus is about two and a half times greater and the moment of inertia is over three times as great as in the former standard design.

Interaxle differential

An interaxle differential housing 56 (Figure 3) is secured to an annular flange 55 on the front of carrier 40 as by bolts 57, and includes a rear section 58, that houses the transfer gearing as will be described, and a forward housing section 59 secured together by bolts 60. The forward section 59 has an annular axially disposed flange 61 that is piloted in a complementary recess 62 formed in rear section 58 to accurately align the assembled sections. A bearing 63 and oil seal 64 are carried in an opening 65 in the front housing section, the bearing being axially disposed against a snap ring 66. Bearing 63 is thus coaxially aligned with the aforementioned bearing 38 which is retained in extension 36 of the front axle rear cover 35.

The interaxle differential 12 within housing 56 consists of a cage assembly 67 having a front member 68 and a rear member 69 fastened together by nuts and bolts 70. A splined input shank 71, formed integral with the front member 68 of the interaxle differential cage assembly, projects forward through the front housing opening 65 and is journalled in bearing 63 coaxial with the short drive shaft 32. The main propeller shaft 72 (Figure 1) is drive connected to splined input shank 71 by a universal coupling of which a part 73 is shown in Figure 3. A spider 74 is non-rotatably mounted inside the cage 67 by radial arms 76 fixed in radially disposed openings 78 formed at the junction of the two cage members 68 and 69. Spider arms 76 rotatably support differential bevel pinion gears 80, all of which mesh with the differential bevel side gears 82 and 84, which in turn are journalled in fore and aft coaxial alignment with cage shank 71. The axial spacing of differential side gears 82 and 84 is limited by annual washer bearing 86 and cage shoulder 88 retaining forward side gear 82, the spider 74 between gears 82 and 84 and by a second annular washer bearing 90 and cage shoulder 92, retaining the rear side gear 84. The bevel pinions 80 are radially positioned between spider shoulders 93 and cup-shaped bearings 94 held against the cage wall around each spider arm 76.

Differential cage assembly 67 is straddle mounted between the interaxle differential forward and rear housing sections 59 and 58 respectively, by ball bearings 63 and 98. The bearing 63, as hereinbefore described, being on the shank end 71 of cage front member 68 and axially retained in the opening 65 through the forward interaxle differential housing section 59 by snap ring 66. The rear ball bearing 98 is piloted on a rearwardly directed annular collar 100 integral with the rear differential cage member 69, abuts against a cage shoulder 104, and is disposed in an opening 106 of an intermediate vertical wall 108 of the interaxle differential rear housing section 58. Bearing 98 is axially retained therein by an internal snap ring 110 that engages the forward face of wall 108. The rear half 73 of the universal coupling member to the main propeller shaft, the inner race of bearing 63 and a cage spacer ring 112 are held in assembly with the ring 112 in abutment against a shoulder 114 of the forward cage member 68 by a nut 116 threaded on the forward end of the cage input shank 71.

The forward differential side gear 82 has a shouldered hub 124 which projects into a blind bore 126 on the inner side of the forward cage member 68 coaxial with the input shank 62. Hub 124 has an axial bore with internal splines 128 non-rotatably coupled to the splined forward end 130 of short through-drive shaft 32. Drive shaft 32 passes coaxially through the rear differential side gear 84 which has an annular hub 132 with axially directed teeth 134 on its end which are engaged with similar axially directed teeth 136 on a forward hub extension 138 of an upper (driving) transfer gear 140.

The transfer gear 140 has a bore 142 through the forward hub extension 138 and a rear hub extension 143, the bore 142 being of sufficient diameter to enable gear 140 to be rotatably supported in spaced concentric relationship to the short through drive shaft 32 by two bearings 144 and 146. Bearing 144 is a sleeve bearing disposed within the rear hub of cage member 69 and around the transfer gear front hub extension 138, while bearing 146 is a ball bearing on the transfer gear rear hub extension 143. Ball bearing 146 is axially retained in an opening 148 in the upper portion of rear wall 150 of the interaxle differential rear housing section 58 by a snap ring 152 and by the front face of mounting flange 55 on the forward axle differential carrier casing 40. Axial movement of the upper transfer gear 140 is limited by the inner race of ball bearing 146, which is retained on the rear hub extension 143 between a transfer gear shoulder 156 and a snap ring 158, and also by the bottoming of axial teeth 136 on the differential side gear teeth 134. The end of transfer gear rear hub extension 143 has integral axially directed clutch teeth 160 projected into the upper portion 41 of the front axle differential carrier 40.

Short through drive shaft 32, which, through the splines 128, is connected to the forward interaxle differential side gear 82, extends back through spider 74, side gear 84, transfer gear 140, the upper portion 41 of front axle differential carrier 40, axle housing 15 and the bearing 38 in the short boss 36 of rear cover 35. The rear projecting end of through shaft 32 as previously described is splined to member 31 of universal joint 30, the shank of member 31 fitting inside of an annular oil seal 163 to prevent loss of oil from front axle housing 15. Within the upper portion 41 of differential carrier 40, shaft 32 is provided with splines 164, immediately adjacent the transfer gear clutch teeth 160, on which is mounted an axially shiftable clutch collar 165.

The clutch collar 165 is provided with axially projecting clutch teeth 166 on its front end which, when the collar is shifted forward move into clutching engagement with clutch teeth 160 on the rear end of the transfer gear rear hub extension 143, and will non-rotationally fix the upper transfer gear 140 to the through drive shaft 32, thereby locking out the interaxle differential 12 to provide positive direct drive to both of axles 14 and 16. Clutch collar 165 has an external annular groove 168 that slidably receives a thrust yoke 170 of clutch fork assembly 172 (Figure 2) which is resiliently, pivotally anchored within differential carrier 40 by a bolt 174 which carries a compression spring 176 and a spring retainer 178 biasing the fork assembly 172 against a semi-spherical pivot abutment 180. The bolt 174 extends through the front wall of carrier 40 and a hole 179 in a side flange of the interaxle differential housing rear section 58. Fork assembly 172 projects from the side of carrier 40 into a clutch shift rail housing 182 mounted on the side of carrier 40. Within housing 182, a second thrust yoke end 184 of clutch fork assembly 172 is engaged in a groove 186 of a collar 188 rigid with shift rail 190. The shift rail 190 is supported at and axially guided by front and rear openings 192 and 194 in the rail housing 182, and is shifted by an air or vacuum actuating means 13 mounted on the front wall of housing 182. To limit the stroke of shift rail 190, a bolt 198 with lock nut 199 is threaded through the rear wall 200 of rail housing 182 in alignment with and engageable by the rear end of the rail.

Upper transfer gear 140 has the same number of teeth as lower transfer gear 49 on hypoid pinion stem 43. The gear 140 is constantly meshed (Figure 4) with an intermediate idler gear 201 (Figures 2 and 5) located below and to one side of gear 140 and supported by combined radial and thrust bearings 202 and 203 on a fixed shaft 204.

The preferable mounting of the idler gear shaft 204 is to mount both ends in one member, the rear interaxle differential housing section 58, so the bores 205 and 206 can be coaxially reamed in a single operation, eliminating the possibility of misalignment due to machining variations that could occur if the shaft 204 were mounted at one end in the carrier 40 and the other end in the section 58. To accomplish this unit mounting arrangement, the rear wall 150 of the interaxle housing section 58 is extended radially on one side to provide a support flange portion 207 which is bored to support the rear end of the idler gear shaft 204. Shaft 204 is inserted through the rear bore 206, bearing 203, gear 201, bearing 202 and projects from bore 205, with enlarged rear end 208 of shaft 204 fitted snugly in bore 206 and abutting the inner race of bearing 203. A nut 209 is drawn tight upon the threaded front end of shaft 204 causing enlarged rear end 208 of shaft 204 to clamp the inner race of bearing 203, a spacer ring 210, and the inner race of bearing 202 in fixed aligned position within the interaxle differential rear housing section 58. Oil channels 212 and 213 in shaft 204 and oil channel 214 in the spacer ring 210 admit a flow of lubricating oil to the bearings 202 and 203. Preferably, as indicated in Figure 4, the interaxle differential rear housing section 58 is formed with pockets arranged in a general cloverleaf pattern to accommodate the transfer gearing consisting of upper gear 140, idler gear 201 and lower gear 49, all three of which are preferably helical.

Lubrication of the various gears is accomplished as follows. The forward axle hypoid ring gear 24 throws oil into a trough 218 (Figure 3) which conducts the oil to the passage 212 in intermediate idler gear shaft 204, thence through passage 213 to bearings 202 and 203. A hole (not shown) at one end of trough 218, mates with an aligned hole 222 (Figure 8) in the interaxle rear housing section 58 to permit part of the oil in trough 218 to run into the bottom of rear housing section 58. This oil is picked up by the transfer gears and thrown into a longitudinal side trough 224 (Figures 6, 7 and 8) integrally formed in upper portion of rear housing section 58. Upper trough 224 is inclined forward and down to divert oil through an opening 225 in wall 108 into the interaxle differential chamber between housing sections 58 and 59. A return hole 226 is formed in wall 108 on the opposite side of the interaxle differential chamber in the direction of differential rotation to enable excess oil to flow back into the gear box adapter section 58. Laboratory tests have shown that oil return hole 226 is more effective at low speeds if its position is as indicated, to the right hand side of the vertical center line.

Several relatively large diameter oil holes 228 are formed in the forward member 68 of the inter-axle differential cage 67 to lubricate the interaxle differential gears. Excess oil in the transfer gear section 58 of the interaxle differential housing can pass back through the hypoid pinion shaft bearings 44 to the forward axle housing 15.

When the tandem axle assembly is in the normal loaded non-articulated condition of Figures 1 and 2, the drive line to the rearward axle extends from the main propeller shaft 72 straight through the interaxle differential cage assembly 67 and the forward axle 14 to the rearward axle 16. Looking down at the drive line in Figure 2, the main propeller shaft 72, input shank 71, drive shaft 32, interaxle propeller shaft 29 and the input pinion stem 22 at the rearward axle 16 have their axes in a straight line longitudinally of the vehicle. Also (Figure 3) the input pinion shaft 43 for the forward axle lies in the vertical longitudinal plane containing the straight through drive line. Furthermore, as shown in Figure 1, the axis of the straight line through drive consisting of shafts 72, 71, 32, 29 and 22 is inclined with respect to the horizontal plane normally containing the axle shaft axes of the assembly. This angle is indicated at $\alpha$, and it will be observed that the axis of input pinion shaft stem 43 for the forward axle 14 is inclined at the same angle $\alpha$ to the horizontal in the assembly. As a result of the disclosed arrangement both hypoid pinions 23 and 42 mesh with the respective hypoid ring gears 24 of the axle differentials the same distance below the horizontal plane of the axle axes and at the forward portion of the axle.

Since the forward axle hypoid pinion stem 43 is parallel to and directly below the through drive shaft 32, drive shaft 32 extending past the top of the forward differential will clear the differential hypoid ring gear 24 because the axis of shaft 32 is offset laterally from the vertical plane of the hypoid ring gear 24 the same distance that the axis of forward hypoid pinion stem 43 is offset. The distance between and the slope of parallel through drive shaft 32 and forward hypoid pinion stem 43 determines the fore and aft spacing between tandem drive axles 14 and 16.

From the foregoing there is hereby provided an improved tandem drive axle assembly equipped with a low cost bevel gear interaxle differential with lockout and hypoid gear single-reduction drive axles in novel combination. It provides a bevel interaxle differential mounting on the front axles of a tandem axle assembly and a through longitudinal drive shaft which viewed from above is parallel to the longitudinal axis of the vehicle and which extends from the interaxle differential through the carrier and axle housings and through a bearing support and cover over an opening in the front axle bowl. This through drive shaft is part of a straight through drive line in both the top plan and the side view (when the unit is in a normal loaded non-articulated state) from the vehicle transmission through the hypoid pinion stem of the rear axle. It provides a tandem axle unit in which the axle housings, the hypoid ring gears, the axle differentials and the axle shafts of both axles are substantially the same and interchangeable.

If desired the hypoid pinions and stems can be made interchangeable. This invention provides for a front axle hypoid pinion drive shaft directly below and parallel to the through drive line for the rear axle. It provides transfer gearing arranged in a cloverleaf design with a top gear directly connected and coaxial with the interaxle differential output member, an intermediate drop gear and a lower gear splined to the hypoid pinion drive stem of the front axle and a gear box housing integral with a section of the interaxle differential housing for enclosing the transfer gearing. The intermediate transfer gear shaft is positioned and supported at both ends in the rear interaxle differential section in bores provided in integral portions of said section which enables the aligned bores to be formed in a single operation.

This invention incorporates the load carrying advantages of tandem drive axles, the compact space saving advantages of hypoid gearing plus the versatility and savings inherent in interchangeable forward and rear axles equipped with an interaxle differential having a lockout. It attains the production and cost advantages of simplicity and compactness. There are no cumbersome offset propelling shafts which result in rapid wear of universal joints and cause noisy and undesirable vibrations, nor is there any side overhang or unbalanced forces which would be created by having one hypoid pinion enmeshed on the forward side of the axle and the other hypoid pinion enmeshed at the rear side of the axle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. For use in combination with a sloping engine driven propeller shaft and a tandem axle assembly including a pair of tandem hypoid single reduction differential drive axles with forwardly extending hypoid pinion input shafts, the combination comprising: a front mounted differential carrier mounted on the front axle including means journalling said front axle hypoid pinion input shaft and an upper structure providing a front to rear passage above said hypoid pinion input shaft; a transfer gear housing mounted on said differential carrier and enclosing the forward end of said hypoid pinion input shaft; means on the upper portion of said transfer gear housing providing an interaxle differential housing and including an interaxle differential having an input and two outputs; means journalling said interaxle differential inputs and outputs in coaxial alignment at the upper end of said transfer gear housing; one of said outputs being a shaft extending through said carrier passage and journalled at the rear of said front axle; the other of said interaxle differential outputs including a transfer drive gear coaxial with said shaft and disposed immediately above said front hypoid pinion input shaft; an intermediate transfer gear, an intermediate transfer gear shaft in said transfer gear housing and rotatably mounting said intermediate transfer gear; a driven transfer gear connected by splines to said front hypoid pinion input shaft so that three transfer gears provide a drive train between said other interaxle differential output and said front hypoid pinion input shaft, means within said carrier for receiving oil from the front axle differential mechanism and directing it to lubricate said intermediate transfer gear shaft and for diverting a portion of said lubricating oil into said transfer gear housing whereby the oil can be picked up carried and thrown off of the teeth of said transfer gearing; means on the upper side portion of said transfer gear housing for receiving oil from said driving transfer gear and directing it into said interaxle differential mechanism and means for enabling excess oil from said interaxle differential to drain back into said transfer gear housing.

2. In a tandem axle assembly including a pair of tandem differential equipped drive axles each having forwardly extending pinion input shafts and meshed pinion and ring gears forming a drive connection between the pinion input shaft and the differential, the front axle comprising: an axle housing, a gear housing rotatably mounting the differential and mounted on the axle housing, means journalling said front axle pinion input shaft on said gear housing, said gear housing having an upper structure providing a front to rear through passage above said pinion input shaft and the differential; and a lower structure enclosing the forward end of said pinion input shaft; and an interaxle differential journalled in said gear housing in alignment with said front to rear passage and having an input and two outputs; one of said outputs being a shaft extending through said housing passage and journalled in said housing at the rear of said front axle; the other of said interaxle differential outputs including a transfer drive gear coaxial with said last mentioned shaft and disposed above said front pinion input shaft; a driven transfer gear connected by splines to said front pinion input shaft and driven by said transfer drive gear to provide a drive train between said other interaxle differential output and said front pinion input shaft, oil pocket means on said gear housing disposed adjacent the front axle differential mechanism ring gear rotation path for collecting oil thrown from said ring gear; means directing oil so collected into said gear housing to lubricate said interaxle differential mechanism and said transfer gears, and means for enabling excess oil from said interaxle differential and transfer gears to drain back into said axle housing.

References Cited in the file of this patent

UNITED STATES PATENTS

| | | |
|---|---|---|
| 1,492,380 | Leipert | Apr. 29, 1924 |
| 1,574,047 | Midboe | Feb. 23, 1926 |
| 1,711,128 | Robbins | Apr. 30, 1929 |
| 1,856,748 | Davis | May 3, 1932 |
| 1,927,276 | Bryan | Sept. 19, 1933 |
| 1,992,365 | Fageol | Feb. 26, 1935 |
| 2,309,162 | Buckendale | Jan. 26, 1943 |
| 2,693,244 | Rockwell et al. | Nov. 21, 1954 |
| 2,699,075 | Buckendale | Jan. 11, 1955 |